United States Patent
Chapman et al.

(10) Patent No.: US 8,437,219 B2
(45) Date of Patent: May 7, 2013

(54) CORRECTING AN ACOUSTIC SIMULATION FOR ELASTIC EFFECTS

(75) Inventors: Christopher H. Chapman, Great Shelford (GB); Johan O. A. Robertsson, Grantchester (GB)

(73) Assignee: WesternGeco L.L.C., Houston, TX (US)

( * ) Notice: Subject to any disclaimer, the term of this patent is extended or adjusted under 35 U.S.C. 154(b) by 561 days.

(21) Appl. No.: 12/693,567

(22) Filed: Jan. 26, 2010

(65) Prior Publication Data

US 2011/0075517 A1  Mar. 31, 2011

Related U.S. Application Data

(60) Provisional application No. 61/247,407, filed on Sep. 30, 2009.

(51) Int. Cl.
*G01V 1/00* (2006.01)
(52) U.S. Cl.
USPC .................. 367/73; 367/37; 702/14
(58) Field of Classification Search ............... 378/8, 90, 378/98, 901; 702/16
See application file for complete search history.

(56) References Cited

U.S. PATENT DOCUMENTS

| | | | |
|---|---|---|---|
| 5,588,032 A * | 12/1996 | Johnson et al. | ............ 378/8 |
| 6,125,330 A | 9/2000 | Robertson et al. | |
| 6,836,448 B2 | 12/2004 | Robertsson et al. | |
| 6,925,387 B2 | 8/2005 | Marin et al. | |
| 2007/0005253 A1 | 1/2007 | Fornel et al. | |

OTHER PUBLICATIONS

PCT Search Report, dated Apr. 28, 2011, Application No. PCT/US2010/050755.
Coates, R.T., et al., Ray perturbation theory and the Born approximation, Geophys. J. Int., 1990, vol. 100, pp. 379-392.
Chapman C.H. et al, Generalized Born scattering in anisotropic media,Wave Motion, 1994, vol. 19, pp. 309-341.
Chapman, Chris., Fundamentals of Seismic Wave Propagation, 2004, Section 10.3, Cambridge University Press, United Kingdom.
Levander, Alan, Fourth-order finite-difference P-SV seismograms,Geophysics, 1988-11, vol. 53,No. 11, pp. 1425-36.
Robertsson, Johan O. A., et al., 2000. A new approach for efficient finite-difference modeling with applications to time-lapse seismics, Geophysics, 65, 907-18, confirmed with page numbers, etc.
Virieux, Jean, P-SV wave propagation in heterogeneous media: Velocity-stress finite-difference method, Geophysics, 1986, vol. 51, No. 4, pp. 889-901.
Woodhouse, J. H., Surface Waves in a Laterally Varying Layered Structure,Geopys. J.R. Astr. Soc., 1974, 37, 461-90.

\* cited by examiner

*Primary Examiner* — Isam Alsomiri
*Assistant Examiner* — Daniel L Murphy

(57) ABSTRACT

A technique includes simulating seismic wave propagation based on an acoustic model and based on a result of the simulation, estimating an error between the result and another result obtained if the seismic wave propagation were simulated based on an elastic model. The technique includes based at least in part on the estimated error predicting the other result without performing the simulation based on the elastic model.

20 Claims, 3 Drawing Sheets

CORRECTING AN ACOUSTIC SIMULATION FOR ELASTIC EFFECTS

This application claims the benefit under 35 U.S.C. §119(e) to U.S. Provisional Patent Application Ser. No. 61/247,407, entitled, "ELASTIC CORRECTION TO ACOUSTIC FINITE-DIFFERENCE SIMULATION," which was filed on Sep. 30, 2009, and is hereby incorporated by reference in its entirety.

BACKGROUND

The invention generally relates to correcting an acoustic simulation for elastic effects.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensor or both. In response to the detected seismic events, the sensors generate electrical signals to produce seismic data. Analysis of the seismic data can then indicate the presence or absence of probable locations of hydrocarbon deposits.

SUMMARY

In an embodiment of the invention, a technique includes simulating seismic wave propagation based on an acoustic model and based on a result of the simulation, estimating an error between the result and another result obtained if the seismic wave propagation were simulated based on an elastic model. The technique includes based at least in part on the estimated error, predicting the other result without performing the simulation based on the elastic model.

Advantages and other features of the invention will become apparent from the following drawing, description and claims.

DETAILED DESCRIPTION

Figure 1:
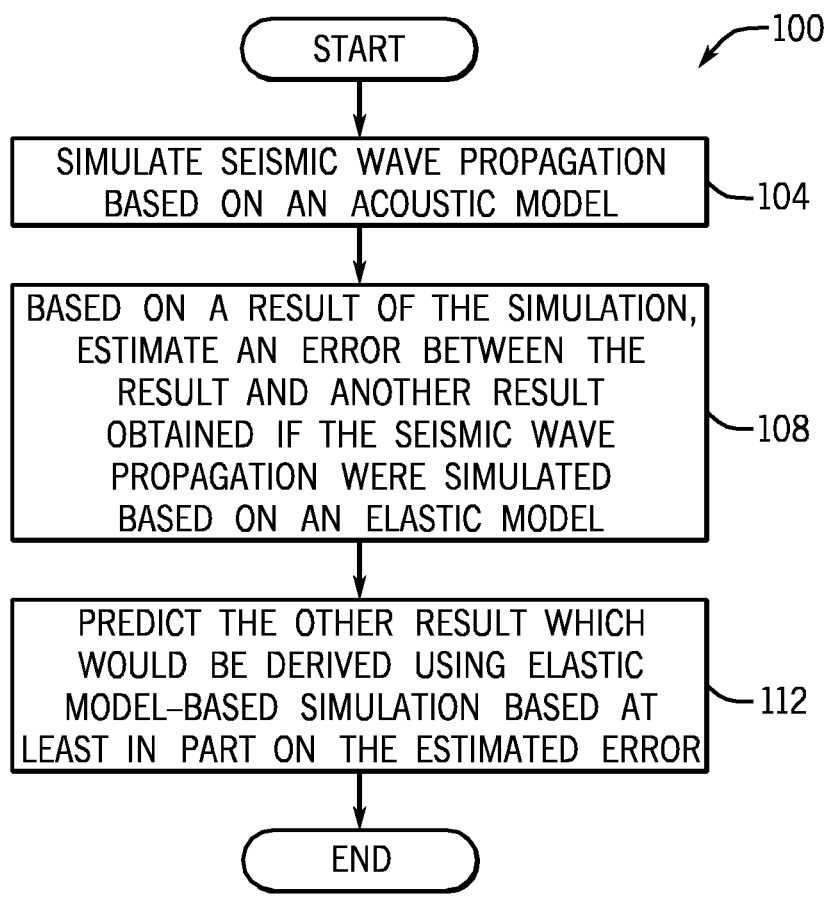
FIGS. 1 and 2 are flow charts illustrating techniques to correct an acoustic finite-difference simulation for elastic effects according to embodiments of the invention.

Seismic wave propagation may be simulated for many purposes, such as for purposes as performing reversed time migration, waveform inversion, etc. To realistically model the Earth, conventional simulations have relied on elastic anisotropic models, and simulations have traditionally been performed using finite-difference algorithms.

It is computationally challenging, however, to perform an elastic, anisotropic finite-difference simulation in three dimensions. One way around this problem is to approximate the simulation using an equivalent acoustic model. However, even for the P waves, the amplitudes of the first arrivals in the acoustic medium significantly differ from those in the elastic medium, thereby conventionally limiting the application of this technique. Contrary to this conventional approach, systems and techniques are disclosed herein for partially correcting an acoustic wavefield derived from an acoustic simulation without incurring the cost of full elastic calculations.

The computational costs (memory space and CPU cycles) of acoustic and elastic finite-difference simulations differ for at least four reasons. First, the number of model parameters is less in an acoustic model. In this manner, in a simple acoustic model two parameters, density and velocity, are needed, and in an isotropic, elastic model, there are three parameters, as there are the P and S velocities. In general anisotropy, there are twenty one elastic parameters in addition to density. For symmetric forms of anisotropy (e.g., transverse isotropy), intermediate numbers apply. Even if the complexity of the two models only requires parameters to be stored at the same points, the saving in the acoustic medium is notable.

The computational costs differ for the second reason that the number of field variables in the acoustic medium is less than the number of field variables in the elastic medium. More specifically, in the acoustic medium there are four field variables relating to particle velocity and pressure, whereas in an elastic medium there are nine field variables relating to the particle velocity and the symmetric stress tensor.

Another difference in the computational costs is that the computations in the equation of motion and constitutive equations are significantly less in acoustic media than in elastic media.

As a final difference, in an acoustic simulation, the size of the cell in the finite-difference grid is controlled by the P velocity, and in the elastic simulation, the size of the cell is controlled by the P and S velocities. In order to obtain the requisite number of points per wavelength to avoid numerical dispersion, the spatial interval is controlled by the minimum velocity. In order to obtain stability, the temporal interval is also controlled by the minimum velocity. Thus, comparing an elastic and acoustic simulation, the number of grid points in each direction and the number of time steps is increased by the ratio of the minimum P velocity to the minimum S velocity in the elastic model. Overall this increase is for three dimensions and time. This raises this ratio to the fourth power. Normally this final difference is the most significant. Even if the elastic medium is a Poisson solid ($\alpha=\sqrt{3}\beta$), the increase in cost is by a factor of nine, and for more realistic models with low shear velocity sediments (such as the ocean floor, for example), the ratio is often between one and two orders of magnitude.

Even if the other three increases in cost may be ignored, the final item makes elastic calculations significantly expensive, and the combination of all four increases makes elastic calculations a real challenge, often raising the cost by between two and three orders of magnitude and introducing memory limitations.

Techniques and systems are disclosed herein to correct an acoustic simulation for some of the effects of elasticity. In particular, the techniques and systems that are disclosed herein allow acoustic model-based simulations to be performed instead of computationally-challenging elastic model-based simulations. As described below, the results of the acoustic model-based simulations are compensated to correct for the effects of elasticity, without requiring the elastic simulations.

The ability to correct the results obtained using an acoustic model to predict the results that would be obtained by using an elastic model takes advantage of some similarities between acoustic and elastic models. Elastic and acoustic models are designed so the density and acoustic velocity (P) match in the two media. For a pressure source, as only P waves will be excited, the solutions in the acoustic medium and for P waves in elastic medium are expected to be very similar, at least in a limited time window around the first arrivals. In other words, the coupling between P and S waves in the elastic medium is small. The most significant differences occur in the amplitudes of reflected and transmitted P waves from interfaces. In the volumes, properties are either homogeneous or vary slowly and smoothly, and the coupling between P and S waves is insignificant. The objective is to correct the acoustic solution for elastic effects at interfaces (or "pseudo-interfaces" where properties vary rapidly), without incurring the overall cost of the full elastic solution.

In the context of this application, "pseudo-interfaces" means regions in which the material properties abruptly change. Typically, the interfaces and pseudo-interfaces occupy between one and two orders of magnitude fewer grid points than the complete model, i.e. between 10 to 1 percent of the grid points, which is relatively small.

The amplitudes of P wave arrivals are corrected for the effects of elasticity, particularly the P wave arrivals caused by reflection and transmission coefficients at interfaces, with a cost considerably less than the cost of full elastic simulations. It is assumed that the difference between the acoustic simulation and the P wave arrivals is small. Although shear waves are generated at interfaces and pseudo-interfaces in the elastic model, it is assumed that their only effect is to modify the P wave arrivals and their independent propagation can be ignored. In other words, it is assumed that the coupling between P and S waves is small, and this difference is only significant in a small fraction of the total model, such as at interfaces or pseudo-interfaces.

Referring to FIG. 1, in accordance with some embodiments of the invention, a technique 100 may be performed for purposes of correcting an acoustic simulation for elastic effects. In particular, the technique 100 includes simulating (block 104) seismic wave propagation based on an acoustic model. Based on the result of this simulation, an error is estimated (block 108) between the result of the acoustic model-based simulation and a result that would be obtained if the seismic wave propagation were simulated based on an elastic model. Pursuant to block 112, the technique 100 includes predicting (block 112) the result that would occur using elastic model-based simulation based at least in part on the estimated error. Thus, results of the elastic model-based simulation are effectively achieved without actually performing this simulation.

A method to derive the error that is used to correct the result of the acoustic model-based simulation is as follows. The equation of motion may be described as follows:

$$\rho \frac{\partial v}{\partial t} = \frac{\partial t_j}{\partial x_j} + f, \qquad \text{Eq. 1}$$

where "v" represents the particle velocity; "ρ" represents density; "f" represents the body forces per unit volume, or source; "x" represents the spatial coordinate; "t" represents time; and $t_j$ represents the traction on the surface normal to the $\hat{e}_j$ axis.

The corresponding constitutive equation is described as follows:

$$\frac{\partial t_k}{\partial t} = c_{kj} \frac{\partial v}{\partial x_j}, \qquad \text{Eq. 2}$$

where "$c_{kj}$" represents the 3×3 matrices of elastic parameters. The $c_{kj}$ matrices for an anisotropic, isotropic and acoustic media are as follows. In general, in anisotropic media, the matrices $c_{kj}$ are as follows:

$$c_{11} = \begin{pmatrix} C_{11} & C_{16} & C_{15} \\ C_{16} & C_{66} & C_{56} \\ C_{15} & C_{56} & C_{55} \end{pmatrix}$$

$$c_{22} = \begin{pmatrix} C_{66} & C_{26} & C_{46} \\ C_{26} & C_{22} & C_{24} \\ C_{46} & C_{24} & C_{44} \end{pmatrix}$$

$$c_{33} = \begin{pmatrix} C_{55} & C_{45} & C_{35} \\ C_{45} & C_{44} & C_{34} \\ C_{35} & C_{34} & C_{33} \end{pmatrix}$$

$$c_{23} = \begin{pmatrix} C_{56} & C_{46} & C_{36} \\ C_{25} & C_{24} & C_{23} \\ C_{45} & C_{44} & C_{34} \end{pmatrix}$$

$$c_{31} = \begin{pmatrix} C_{15} & C_{56} & C_{55} \\ C_{14} & C_{46} & C_{45} \\ C_{13} & C_{36} & C_{35} \end{pmatrix}$$

$$c_{12} = \begin{pmatrix} C_{16} & C_{12} & C_{14} \\ C_{66} & C_{26} & C_{46} \\ C_{56} & C_{25} & C_{45} \end{pmatrix},$$

where $C_{ij}$ are the Voigt parameters.

In isotropic media, these matrices reduce to the following:

$$c_{11} = \begin{pmatrix} \lambda + 2\mu & 0 & 0 \\ 0 & \mu & 0 \\ 0 & 0 & \mu \end{pmatrix}$$

$$c_{23} = \begin{pmatrix} 0 & 0 & 0 \\ 0 & 0 & \lambda \\ 0 & \mu & 0 \end{pmatrix},$$

with cyclic transpositions for the other matrices, where "λ" and "μ" are the Lamé parameters. Finally in acoustic media, the matrices may be described as follows:

$$c_{11} = \begin{pmatrix} \kappa & 0 & 0 \\ 0 & 0 & 0 \\ 0 & 0 & 0 \end{pmatrix}$$

$$c_{23} = \begin{pmatrix} 0 & 0 & 0 \\ 0 & 0 & \kappa \\ 0 & 0 & 0 \end{pmatrix}$$

where "κ" represents the bulk modulus.

Although partial differential equations are used herein, as can be appreciated by the skilled artisan, these equations may be replaced by discrete, finite-difference equations for use in a numerical algorithm.

In acoustic media, the tractions reduce to the following with zero shear stress:

$$(t_k)_j = -P\delta_{jk}. \quad \text{Eq. 3}$$

where "$\delta$" represents the Kronecker's delta. Due to this relationship, Eq. 1 may be rewritten as follows:

$$\rho \frac{\partial v}{\partial t} = -\nabla P + f, \text{ and} \quad \text{Eq. 4}$$

Eq. 2 may be rewritten as follows:

$$-\frac{\partial P}{\partial t} = \kappa \nabla \cdot v. \quad \text{Eq. 5}$$

In the following discussion, the acoustic variables, both model and solution, are denoted by the superscript "$^A$." For example, "$v^A$" represents the acoustic velocity solution. Furthermore, in the following discussion, the elastic variables, model and solution are denoted by the superscript "$^E$," such as the velocity $v^E$, which is the velocity obtained using the elastic model. Moreover, in the following discussion, it is assumed that the acoustic and elastic solutions for P waves are similar, as the solutions disclosed herein refer to the particle displacement velocity, v. The differences in the elastic parameters are not small, i.e. $c_{kj}^A$ and $c_{kj}^E$, differ significantly. Thus, the following relationship holds for the particle velocities:

$$|v^A - v^E| \sim O(\epsilon), \quad \text{Eq. 6}$$

where "$\epsilon$" represents a relatively small term, at least for a limited time. However, $t_k^A$ differs significantly from $t_k^E$. For instance, the shear stresses are necessarily zero in the acoustic medium as the shear modulus $\mu$ is zero, whereas the shear stresses are non-zero in the elastic medium as the corresponding shear strains are non-zero. The differences between the two models are not small. The stiffness matrices $c_{kj}^A$ and $c_{kj}^E$ do not differ by a small parameter. Nevertheless, the densities in the two models are identical such that $\rho^A$ is equal to $\rho^E$. If the densities in the two models were different, then the amplitudes of the acoustic and elastic solutions would differ significantly due to the impedance differences. Although Eqs. 1 and 2 are written in a form, which suggests a symmetry between the particle velocity and tractions, this symmetry does not exist in the acoustic versus elastic problem under consideration.

The acoustic and P wave velocities are identical, as differences in the kinematic properties cause the arrivals in the two models to separate and be at significantly different times. As a result, convergence of an iterative procedure may be poor. However, by restricting the mismatch in kinematic properties to small regions, the temporal mismatch is small enough that the iterations are effective.

Applying Eq. 4, a solution $v^A$ satisfies the following equation:

$$\rho \frac{\partial v^A}{\partial t} = -\nabla P^A + f, \quad \text{Eq. 7}$$

where "$P^A$" represents the hydrostatic pressure. In the acoustic equation, the constitutive equations define the pressure via Eq. 5, as described below:

$$-\frac{\partial P^A}{\partial t} = \kappa^A \nabla \cdot v^A. \quad \text{Eq. 8}$$

Using the acoustic solution $v^A$ as an approximation for the elastic solution, the traction solutions in the elastic medium satisfy the following:

$$\frac{\partial t_j^A}{\partial t} = c_{kj}^E \frac{\partial v^A}{\partial x_j}. \quad \text{Eq. 9}$$

The acoustic solutions do not exactly satisfy the elastic equation of motion (Eq. 1), and as result, the corresponding error (called "E" below) may be described as follows:

$$E = \rho \frac{\partial v^A}{\partial t} - \frac{\partial t_j^A}{\partial x_j} - f. \quad \text{Eq. 10}$$

If the elastic equation is replaced by an equation with an additional effective source E, then the source E cancels the error so that the acoustic solution satisfies exactly the elastic equation, as set forth below:

$$\rho \frac{\partial v}{\partial t} = \frac{\partial t_j}{\partial x_j} + f + E. \quad \text{Eq. 11}$$

Conversely, an effective source $-E$ in the acoustic equation may be described as follows:

$$\rho \frac{\partial v}{\partial t} = -\nabla P + f - E. \quad \text{Eq. 12}$$

In other words, the effective source $-E$ modifies the acoustic solution by scattering new waves from each point where the acoustic solution does not satisfy the elastic equation.

The error E may be described exactly as follows:

$$E = \rho \frac{\partial}{\partial t}(v^A - v^E). \quad \text{Eq. 13}$$

Thus, using Eq. 13, the elastic solution may be exactly reproduced with the modified acoustic Eq. 12. If the error term is only included in a small region (such as at the interfaces or pseudo-interfaces) to reduce costs, then artifact reflections would be generated from the boundaries of this region due to the change from elastic to acoustic media. Instead of employing such an approach, however, the error term E of Eq. 10 is introduced as an "effective" source in an independent solution of the acoustic equation. The solution is then a correction to the original, zeroth-iteration solution of the acoustic equation. Thus, the solution set forth in Eq. 9 is called the zeroth iteration, has a notation of superscript "$^{(0)}$" and is described as follows:

$$\rho \frac{\partial v^{(0)}}{\partial t} = -\nabla P^{(0)} + f. \qquad \text{Eq. 14}$$

Eq. 14 may be used to calculate the error E in the elastic equation as follows:

$$\frac{\partial t_j^{(0)}}{\partial t} = c_{kj}^E \frac{\partial v^{(0)}}{\partial x_j}, \qquad \text{Eq. 15}$$

and $$E^{(0)} = \rho \frac{\partial v^{(0)}}{\partial t} - \frac{\partial t_j^{(0)}}{\partial x_j} - f. \qquad \text{Eq. 16}$$

The $E^{(0)}$ error drives the first iteration, as set forth below:

$$\rho \frac{\partial v^{(1)}}{\partial t} = -\nabla P^{(1)} - E^{(0)}, \text{ and} \qquad \text{Eq. 17}$$

the corrected solution is described as follows:

$$v \approx v^{(0)} + v^{(1)}. \qquad \text{Eq. 18}$$

Shear waves are never generated, as Eq. 17 is purely an acoustic equation with distributed sources, which themselves can only "propagate" with acoustic velocities. The iterative procedure may be continued with Eq. 18 being used to calculate the next order error (i.e., "$E^{(1)}$"). However, this additional iteration may not be necessary, as the acoustic solution begins as a good approximation to the elastic solution.

Although at least two acoustic model-based simulations are performed, the computational savings is significant as an elastic simulation is not performed. The equivalent elastic tractions (Eq. 15) and error terms (Eq. 16) are only calculated on the coarser acoustic grid and at the small percentage of points where the P-S coupling is significant and as such, only add marginally to the cost.

It is noted that the derivatives of the equivalent elastic tractions in equations Eq. 15 and Eq. 16 are with respect to different variables, and when calculating the errors Eq. 16, particle accelerations are needed which are not normally saved. Normally the particle velocity is immediately updated using Eq. 14 without explicitly calculating the acceleration. To calculate the error E in Eq. 16, the acceleration is calculated and saved into the error term before updating the velocity. The previous equivalent elastic traction, $t_j^{(0)}$, is saved in order to update it by time integration using equation Eq. 15. Nevertheless, the computational cost in determining these variables is not significant, as the variables are only needed in regions where P-S coupling is important. In an efficient algorithm it is important to identify these regions a-priori (perhaps using one full elastic simulation). The variables $t_j^{(0)}$ and $E^{(0)}$ are only calculated and stored at the points where the coupling is significant.

Figure 2:
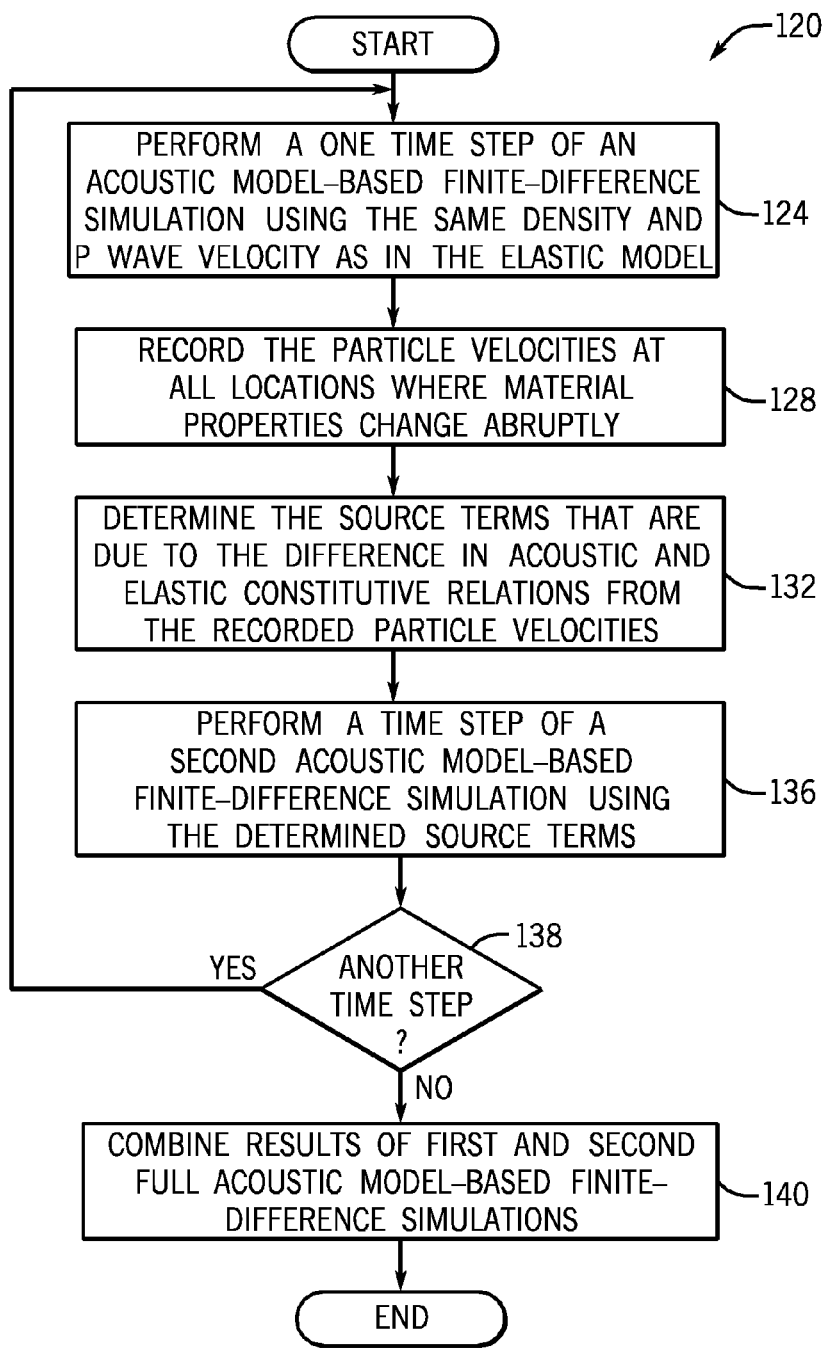

To summarize, referring to FIG. 2, in accordance with some embodiments of the invention, a technique 120 may be performed for purposes of correcting an acoustic model-based finite-difference simulation of elastic effects. Pursuant to the technique 120, one time step of the acoustic finite-difference simulation is performed (block 124) using the same density and P wave velocity as in the elastic model. For this simulation, a source is excited at a chosen location. The technique 120 includes recording (block 128) the particle velocities at all locations where the material properties change abruptly, i.e., recording the particle velocities at interfaces and pseudo-interfaces.

Next, according to the technique 120, source terms that are due to the difference in acoustic and elastic constitutive relations are determined (block 132) from the stored particle velocities identified in block 128. A time step of a second acoustic finite-difference simulation is then performed, pursuant to block 136. In this second model-based simulation, the original source is not excited, but rather, the source terms that coincide with locations in the model of abrupt material property changes are excited. If another time step is to be performed (diamond 138), then control returns to block 124. Finally, pursuant to the technique 120, the results of the two iterations are combined, pursuant to block 140, to generate determined particle velocities, which are generated using acoustic model-based finite-difference simulations but account for elastic effects.

The technique 120 performs the first and second acoustic simulations in a step-by-step sequence for purposes of efficiency, as this sequence avoids the use of significant storage. However, as can be appreciated by the skilled artisan, full first and second acoustic simulations may be performed separately in other embodiments of the invention. Thus, many variations are contemplated and are within the scope of the appended claims.

Figure 3:
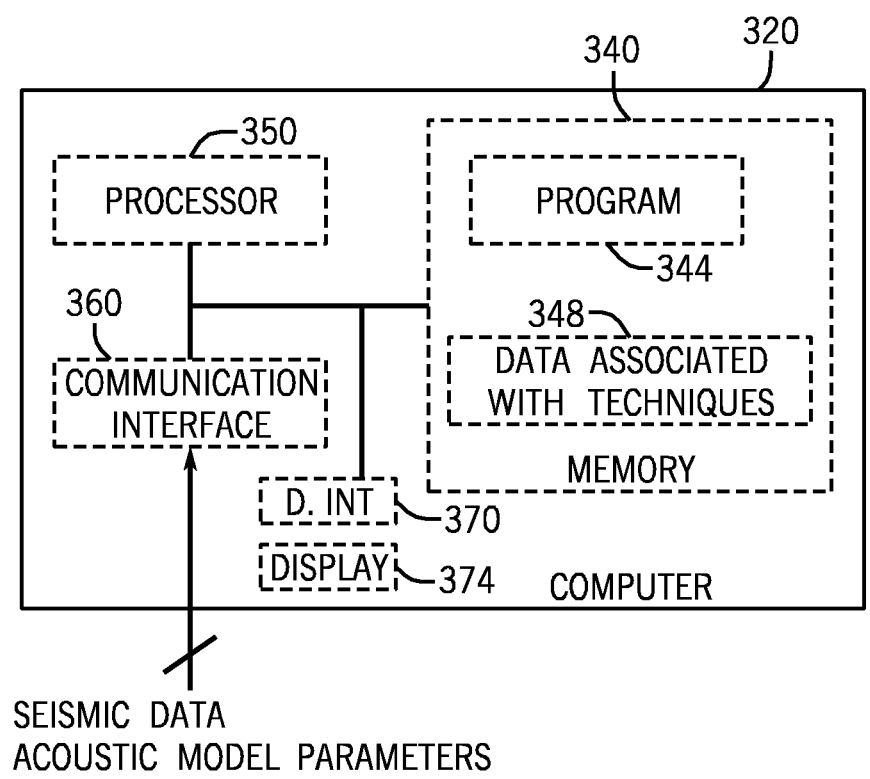
FIG. 3 is a schematic diagram of a data processing system according to an embodiment of the invention.

Referring to FIG. 3, in accordance with some embodiments of the invention, a processing system 320 may perform at least part of one or more of the techniques that are disclosed herein, such as techniques 100 (FIG. 1) and/or 120 (FIG. 2).

The system 320 may be located on one of the streamers 30, on each streamer 30, distributed among the streamers 30, on the seismic source 40, on the survey vessel 20, at a remote land-based facility, etc. The system 320 may also be distributed on one or more of these entities, in accordance with other embodiments of the invention. In accordance with some embodiments of the invention, the system 320 may include a processor 350, such as one or more microprocessors and/or microcontrollers.

The processor 350 may be coupled to a communication interface 360 for purposes of receiving, for example, data, which are indicative of acoustic model parameters. In accordance with some embodiments of the invention, a data processing system 320 may include a processor 350 that is constructed to execute at least one program 344 (stored in a memory 340) for purposes of performing one or more of the techniques that are disclosed herein. In addition to storing instructions for the program 354, the memory 340 may store preliminary, intermediate and final datasets involved in the techniques that are disclosed herein. Among its other features, the data processing system 320 may include a display interface 370 and display 374 for purposes of displaying the various curves and models that are generated as described herein.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   processing data representative of acoustic model parameters in a processor-based machine to simulate seismic wave propagation in a first simulation based on an acoustic model;

based on a result of the first simulation, estimating an error between the result and another result obtained if the seismic wave propagation were simulated in a second simulation based on an elastic model; and predicting the result obtained with the second simulation without performing the second simulation, based at least in part on the estimated error.

2. The method of claim 1, wherein the act of predicting comprises:
performing another seismic wave propagation simulation based on the acoustic model and the estimated error.

3. The method of claim 2, wherein the act of performing said another seismic wave propagation simulation comprises using the estimated error as a source in said another seismic wave propagation simulation.

4. The method of claim 3, wherein the act of processing the data to simulate the seismic wave propagation based on the acoustic model comprises using a first source, and the act of performing the second simulation does not use the first source.

5. The method of claim 2, wherein
the act of processing the data to simulate the seismic wave propagation comprises determining a first particle velocity; and
the act of performing the second simulation comprises determining a second particle velocity, and
the act of predicting the result obtained with the second simulation comprises determining a third particle velocity based on a combination of the first and second particle velocities.

6. The method of claim 1, further comprising:
identifying locations where material properties change relatively abruptly;
recording particle velocities determined at the identified locations,
wherein the act of predicting comprises performing another seismic wave propagation simulation with sources based on the recorded particle velocities.

7. The method of claim 1, wherein:
estimating the error comprises estimating the error based at least in part on a wavefield property derived from the first simulation and evaluated at a location at which a material property changes more rapidly than at another location; and
predicting the other result without performing the second simulation comprises using a source based on the error in another acoustic model-based simulation.

8. The method of claim 1, wherein estimating the error comprises estimating a difference between acoustic and elastic constitutive relations evaluated at a selected location based at least in part on a wavefield property at the selected location derived from the first simulation.

9. A system comprising:
an interface to receive parameters associated with an acoustic model; and
a processor to:
simulate seismic wave propagation in a first simulation based on the acoustic model;
based on a result of the first simulation, estimate an error between the result and another result obtained if the seismic wave propagation were simulated in a second simulation based on an elastic model; and
predict the result obtained with the second simulation without performing the second simulation, based at least in part on the estimated error.

10. The system of claim 9, wherein the processor is adapted to perform another seismic wave propagation simulation based on the acoustic model and the estimated error.

11. The system of claim 10, wherein the processor is adapted to use the estimated error as a source in said another seismic wave propagation simulation.

12. The system of claim 11, wherein the processor is adapted to use an additional source in the initial simulation of the seismic wave propagation.

13. The system of claim 10, wherein the processor is adapted to determine a first particle velocity in the initial seismic wave propagation, determine a second particle velocity in said another seismic wave propagation simulation and determine a third particle velocity based on the combination of the first and second particle velocities.

14. The system of claim 9, wherein the processor is adapted to:
identify locations where material properties change relatively abruptly;
record particle velocities determined at the identified locations,
perform another seismic wave propagation simulation with sources based on the recorded particle velocities.

15. An article comprising a computer readable non-transitory storage medium storing instructions that when executed by a computer cause the computer to:
simulate seismic wave propagation in a first simulation based on an acoustic model;
based on a result of the first simulation, estimate an error between the result and another result obtained if the seismic wave propagation were simulated in a second simulation based on an elastic model; and
predict the result obtained with the second simulation without performing the second simulation, based at least in part on the estimated error.

16. The article of claim 15, the storage medium storing instructions that when executed cause the computer to perform another seismic wave propagation simulation based on the acoustic model and the estimated error.

17. The article of claim 16, the storage medium storing instructions that when executed cause the computer to use an estimated error as a source in said another seismic wave propagation simulation.

18. The article of claim 17, the storage medium storing instructions that when executed cause the computer to use different sources in the seismic wave propagation simulations.

19. The article of claim 16, the storage medium storing instructions that when executed cause the computer to:
determine a first particle velocity in the initial seismic wave propagation simulation;
determine a second particle velocity in said another seismic wave propagation simulation; and
determine a third particle velocity based on a combination of the first and second particle velocities.

20. The article of claim 15, the storage medium storing instructions that when executed to cause the computer to:
identify locations where material properties change relatively abruptly;
record particle velocities determined at the identified locations,
perform another seismic wave propagation simulation with sources based on the recorded particle velocities.

* * * * *